March 20, 1956     W. B. MORRIS     2,738,972
RESILIENT TRUNNION ACTUATOR SUPPORT
Filed Jan. 30, 1953
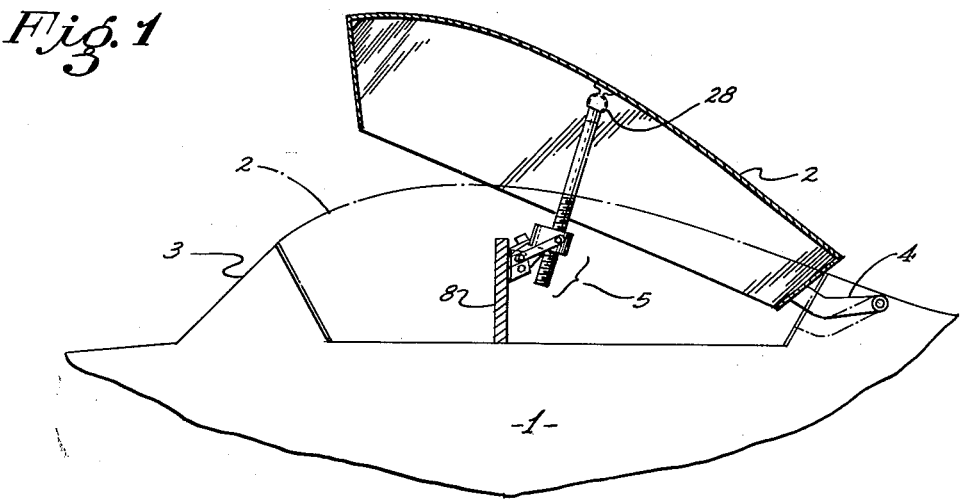
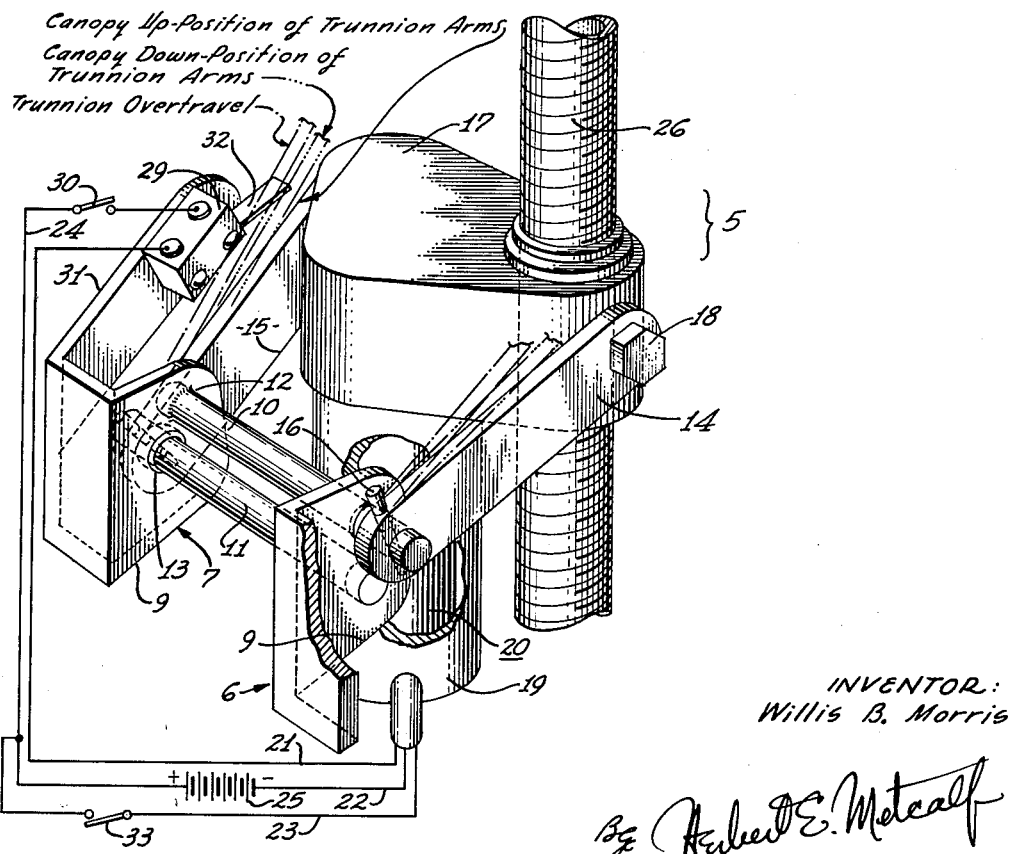
INVENTOR:
Willis B. Morris
By Herbert E. Metcalf
His Patent Attorneys United States Patent Office 2,738,972
Patented Mar. 20, 1956

2,738,972

RESILIENT TRUNNION ACTUATOR SUPPORT

Willis B. Morris, Hawthorne, Calif., assignor to Northrop Aircraft, Inc., Hawthorne, Calif., a corporation of California Application January 30, 1953, Serial No. 334,294

3 Claims. (Cl. 268—74)

This invention relates to mounting means and more particularly to resilient mounting means which permits free pivotal movement in one plane and spring restrained motion in a plane at right angles thereto.

While the present invention may be utilized in any type of installation in which a mounting means is required it is particularly adapted for resiliently mounting a part which is normally raised and lowered in a vertical plane about a pivot point but which may also be subject to movements of a lesser degree in a horizontal plane. A mounting means as disclosed in the present invention may be used, for example, in mounting the canopy of an airplane, the canopy being pivotally moved between its open and closed positions, by means of a single actuator, about a pivot point adjacent the aft end of the canopy.

Quite frequently a plane having a canopy mounted as described above is taxied with the canopy in its open position. At such times the canopy may be subject to a certain amount of lateral motion as well as up and down motion, particularly such motion of the canopy is present if it is subject to a cross wind or the plane is taxied over rough terrain.

Accordingly it is an object of the present invention to provide a mounting means which permits pivotal movement in a plurality of planes.

Another object is to provide novel resilient mounting means for one component part of a machine or apparatus with respect to another component part when the two parts are either in spaced or contacting relationship.

Another object is to provide a novel resilient mounting means whereby a part may be accurately positioned with respect to another part when in contacting relationship.

A better understanding of the invention will become apparent from the following description and drawings. It is to be expressly understood, however, that the following description and drawing is for purposes of illustration only and not a definition of the limits of the invention, reference being had for this purpose to the appended claims.

In the drawing:

Figure 1 is a fragmentary perspective view of an airplane in which a preferred form of the resiliently supported actuating device, as disclosed in the present invention, is utilized to mount a plane's canopy for movement between its open and closed positions.

Figure 2 is a perspective view of the resiliently supported actuating device, as shown in Figure 1, on a larger scale.

Referring to Figure 1 a portion of an airplane 1 is shown, the plane having a canopy 2 adapted to close the cockpit 3 of the plane. The canopy is mounted to the plane by means of a pivotal attach member 4, located adjacent its aft end, and a resilient mounting actuating assembly 5 located approximately at the mid-portion of the canopy. The canopy is raised and lowered by an actuator associated with the resilient mounting actuating assembly by pivoting it about the attach member.

The resilient mounting actuating assembly 5 comprises a pair of L-shaped bracket members 6 and 7, one leg portion of each bracket member is fixedly attached to structural members 8 of the airplane, the structural members being equally spaced on each side of the longitudinal axis of the plane. The other legs 9 of the brackets are parallel to each other and the longitudinal axis of the plane, and extend rearwardly from structural members 8. Mounted in the legs 9 of the brackets are a pair of spaced circular trunnion rods 10 and 11 passing through suitable apertures therein. Rod 10 is positioned so that one of its ends is flush with the outer surface of the leg 9 of the bracket 7 and is welded in this position as indicated at 12, the other end is freely supported in a bushing 13 and extends a suitable distance beyond the outer surface of the leg 9 of bracket 6 for a purpose which will be presently apparent. Rod 11 is similarly mounted, however, one of its ends is welded to the leg 9 of bracket 6 while its other end extends beyond the leg 9 of bracket 7 and is likewise freely supported in a bushing 13. Mounted on the extending end portions of the rods 10 and 11 are trunnion arms 14 and 15 which extend rearwardly and upwardly from the rods, the arms are fixedly secured to the rods 10 and 11 by any suitable means, tapered pins 16 being used in the present embodiment. Positioned between the outer ends of the arms 14 and 15 is a spacer member 17, the member being pivotally attached to the outer ends of the arms by means of cap screws or pins 18.

Depending from the spacer member 17 is a protective cover 19 housing a reversible electric motor 20 also depending from the spacer member.

Electric conductors 21 to 24, inclusive, extend between the electric motor and a source of electric power 25, the conductors providing two flow paths for current to the motor thereby enabling it to be rotated either clockwise or counter-clockwise. Extending through an aperture in the spacer member is a tubular member 26 provided with screw threads on its outer surface, the tubular member being positioned generally vertical as shown in the figures. The threads on tubular member 26 threadably engage a gear (not shown) which is supported in a suitable conventional manner by the spacer member, a conventional gear train (not shown) transmits rotary movement of the motor 20 to the gear resulting in a raising or lowering of the tubular member and canopy depending upon the direction of rotation of the motor 20. The upper end of the tubular member is attached to a suitable structural member of the canopy by means of a ball and socket connection 28.

A limit switch 29 is placed in the electric circuit, comprising conductors 21, 22, and 24 and a manually operated switch 30, it is assumed that current flowing through conductors 21, 22 and 24 results in a clockwise rotation of the reversible motor accompanied by a lowering of the tubular member 26 and canopy 2. The switch 29 is mounted on an arm 31 extending from bracket 7 and is located so its actuator arm 32 is positioned in the line of travel of the arm 15. The switch 29 regulates the downward travel of member 26 and the canopy in a manner of which will be presently apparent. Another electric circuit, comprising conductors 22 and 23, and 24 and a manually operated switch 33 is also provided which when energized results in a counter-clockwise rotation of the reversible motor accompanied by a raising of the tubular member and canopy.

In the canopy's fully lowered position, as indicated by phantom construction in Figure 1, a certain amount of torsional stress is placed in the rods 10 and 11. This stress is induced by over-travel of the spacer member 17 after the canopy has positioned itself on the sides of the cockpit. At the time the canopy seats itself on the cockpit the motor is still energized, accordingly it will continue to exert a downward force on the canopy, through the tubular member 26, which force will be resisted by the sides of the cockpit. As the canopy can not be lowered further the spacer member 17 moves upward on the tubular member until the link 15 contacts the actuator arm 32, at this time the electric circuit to the motor is de-energized, momentum of the moving parts results in a slight additional travel of the spacer member in an up direction. The position of link members 15 as it contacts the actuator arm 32 and its final position is shown in phantom construction and so indicated in Figure 2.

The above construction insures the canopy seating itself with approximately the same degree of firmness each time it is lowered as its positioning is automatically controlled. The torsional stress induced in the rods 10 and 11 will resiliently retain the canopy in its fully lowered position prior to the time it is locked in its down position.

The canopy is raised by energizing the circuit comprising conductors 22, 23 and 24 by closing manual switch 33 causing the motor 20 to rotate in a counter-clockwise direction. As the motor and tubular member 26 are actuated the spacer member 17 is first lowered until the torsional stress is removed from the rods 10 and 11 and an opposite torsional stress induced therein sufficient to overcome the weight of the canopy. Further actuation of member 26 raises the canopy to a fully open position as shown by solid construction in Figure 1. Its fully open position may also be determined by a conventional limit switch (not shown) if desired.

The above construction of the mounting-actuator assembly permits the tubular member 26 to pivot about pins 18 in a fore and aft direction and also in a lateral direction with respect to the airplane. The lateral pivoting is permitted by the depressing or raising of either one of the links independently of the other. This feature is advantageous should the plane be taxied with the canopy in its open position particularly if the plane is taxied over rough terrain or is subject to a cross wind. Under these conditions the canopy will necessarily move to a certain degree from side to side. The mounting-actuating assembly through the trunnion rods will permit such movement without damage to any of its parts and return the canopy to a position in which it is symmetrical with respect to the airplane. It is further apparent that any up and down movement of the canopy will also be absorbed by the trunnion rods.

While in order to comply with the statutes, the invention has been described in language more or less specific as to structural features, it is to be understood that the invention is not limited to the specific features shown, but that the means and construction herein disclosed comprise a preferred form of several modes of putting the invention into effect, and the invention is therefore claimed in any of its forms or modifications within the legitimate and valid scope of the appended claims.

What is claimed is:

1. A mounting device for resiliently supporting and moving a non-stationary structure with respect to a fixed structure, comprising: first and second mounting members adapted to be secured to said fixed structure, first and second resilient rods mounted on said members in spaced parallel relation with respect to each other: one end of said first rod being fixedly secured to said first member and mounted for free angular movement in said second member; one end of said second rod being fixedly secured to said second member and mounted for free angular movement in said first member, first and second elongated link members each having one end fixedly secured to the free ends of said first and second rods, respectively; a spacer member mounted between and pivotally attached to the other ends of said link members; said link members being secured to said rods so that the axis about which said spacer member pivots on said links is normally parallel to the axes of said rods; an elongated supporting member movably mounted on said spacer member and adapted to support said non-stationary structure; and power means operationally connected to said supporting member whereby the latter may be moved throughout a major portion of its length with respect to said spacer member when said power means is engaged.

2. A mounting device as set forth in claim 1: further characterized by said supporting member comprising a threaded rod and said power means comprising a bidirectional rotary motor; said supporting member having an end adapted to support said non-stationary structure; and a source of power for said motor.

3. In a mounting device for resiliently supporting and allowing movement of a non-stationary structure with respect to a fixed structure, comprising: first and second mounting members adapted to be secured to said stationary structure; first and second resilient rods mounted on said members in parallel spaced relation with respect to each other; one end of said first rod being fixedly secured to said first member and mounted for free angular movement in said second member; one end of said second rod being fixedly secured to said second member and mounted for free angular movement in said first member, first and second elongated link members each having one end fixedly secured to the free ends of said first and second rods, respectively; a spacer member mounted between and pivotally attached to the other ends of said link members; said link members being secured to said rods so that the axis about which said spacer member pivots on said links is normally parallel to the respective axes of said rods.

References Cited in the file of this patent

UNITED STATES PATENTS

| | | |
|---|---|---|
| 2,412,871 | Clark | Dec. 17, 1946 |
| 2,499,166 | Russell | Feb. 28, 1950 |